Aug. 23, 1955     L. BROWNSTEIN     2,715,984
METHOD AND APPARATUS FOR THREADING BUCKLES
Filed Aug. 6, 1954     11 Sheets-Sheet 3
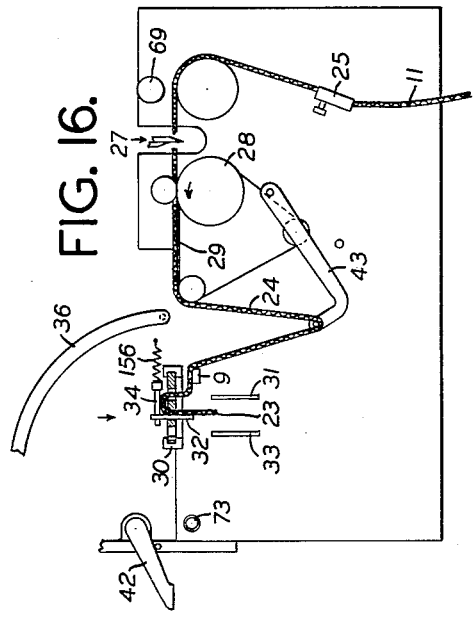
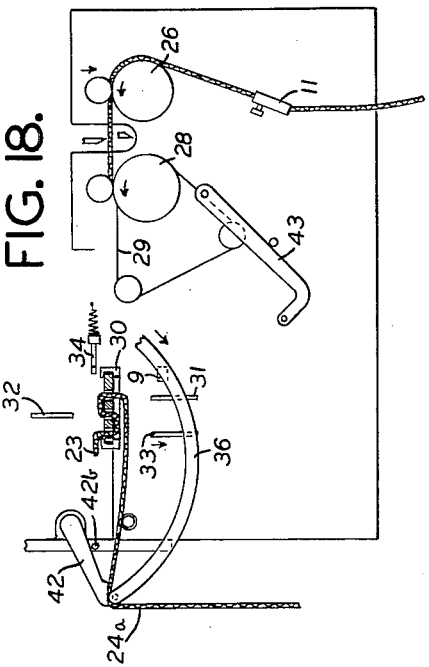
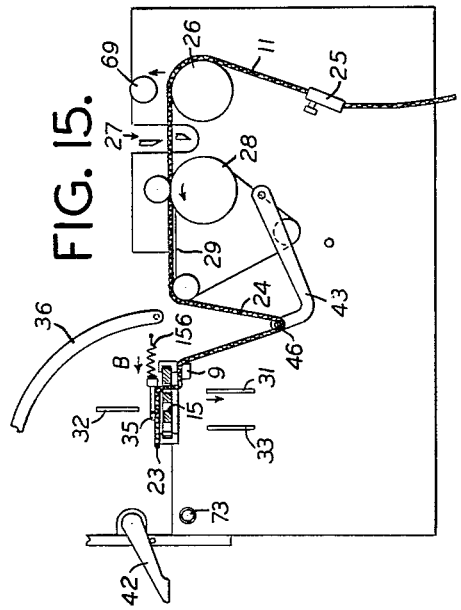
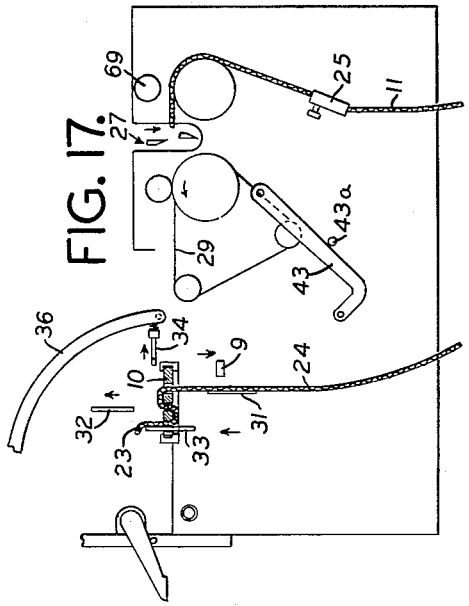
INVENTOR.
LOUIS BROWNSTEIN.
BY
HIS ATTORNEY.

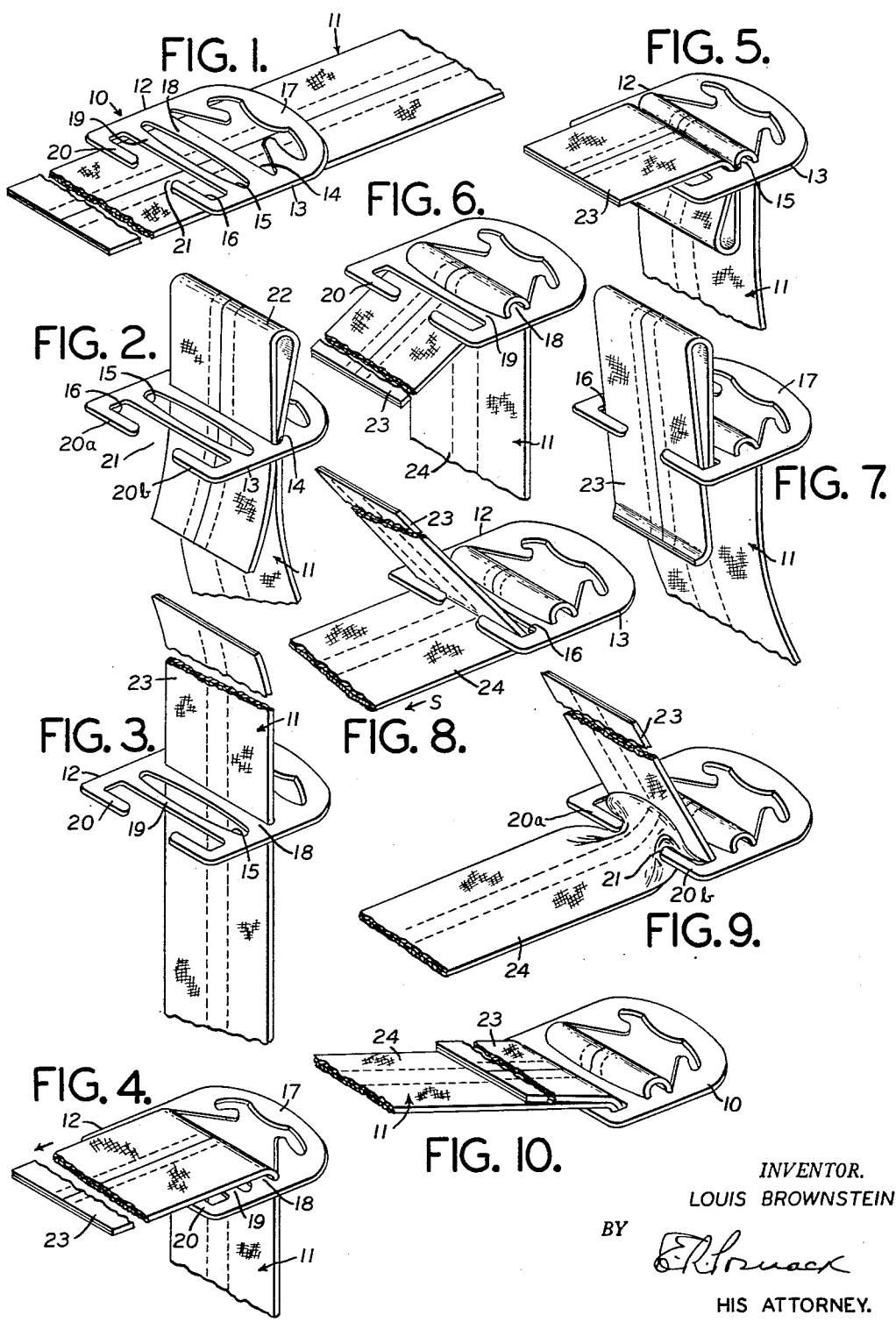

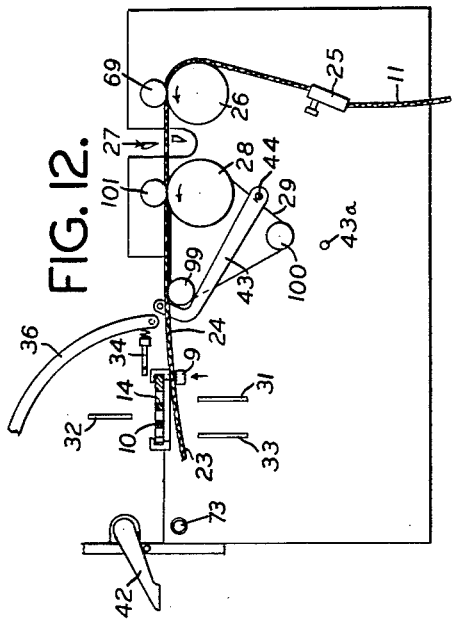
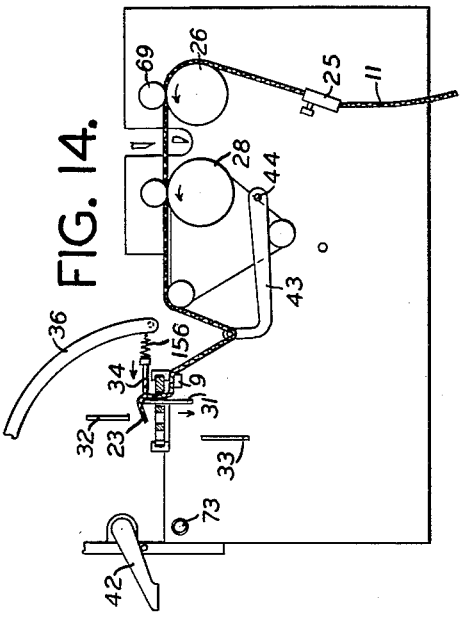
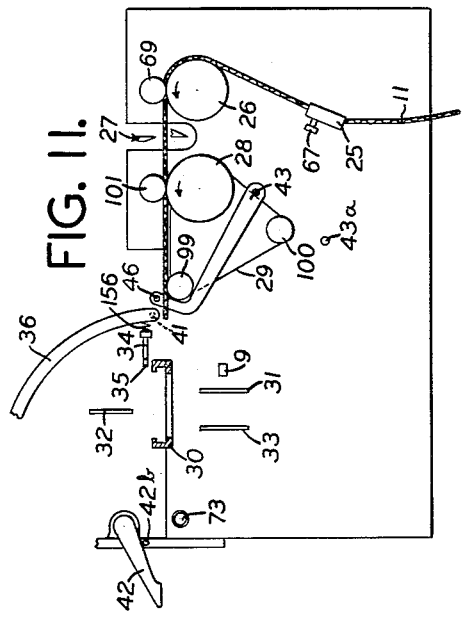
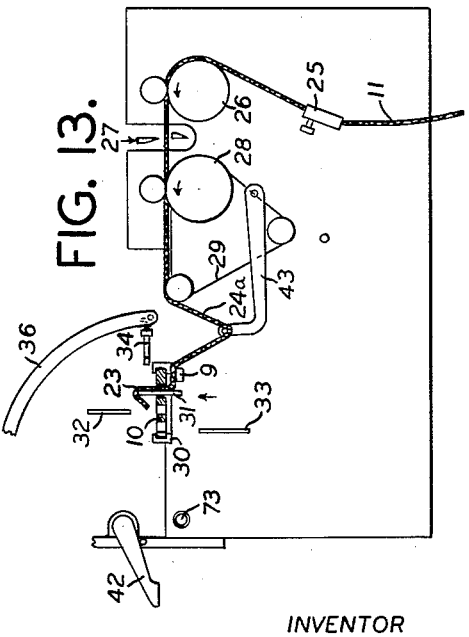

Aug. 23, 1955 L. BROWNSTEIN 2,715,984
METHOD AND APPARATUS FOR THREADING BUCKLES
Filed Aug. 6, 1954 11 Sheets-Sheet 4
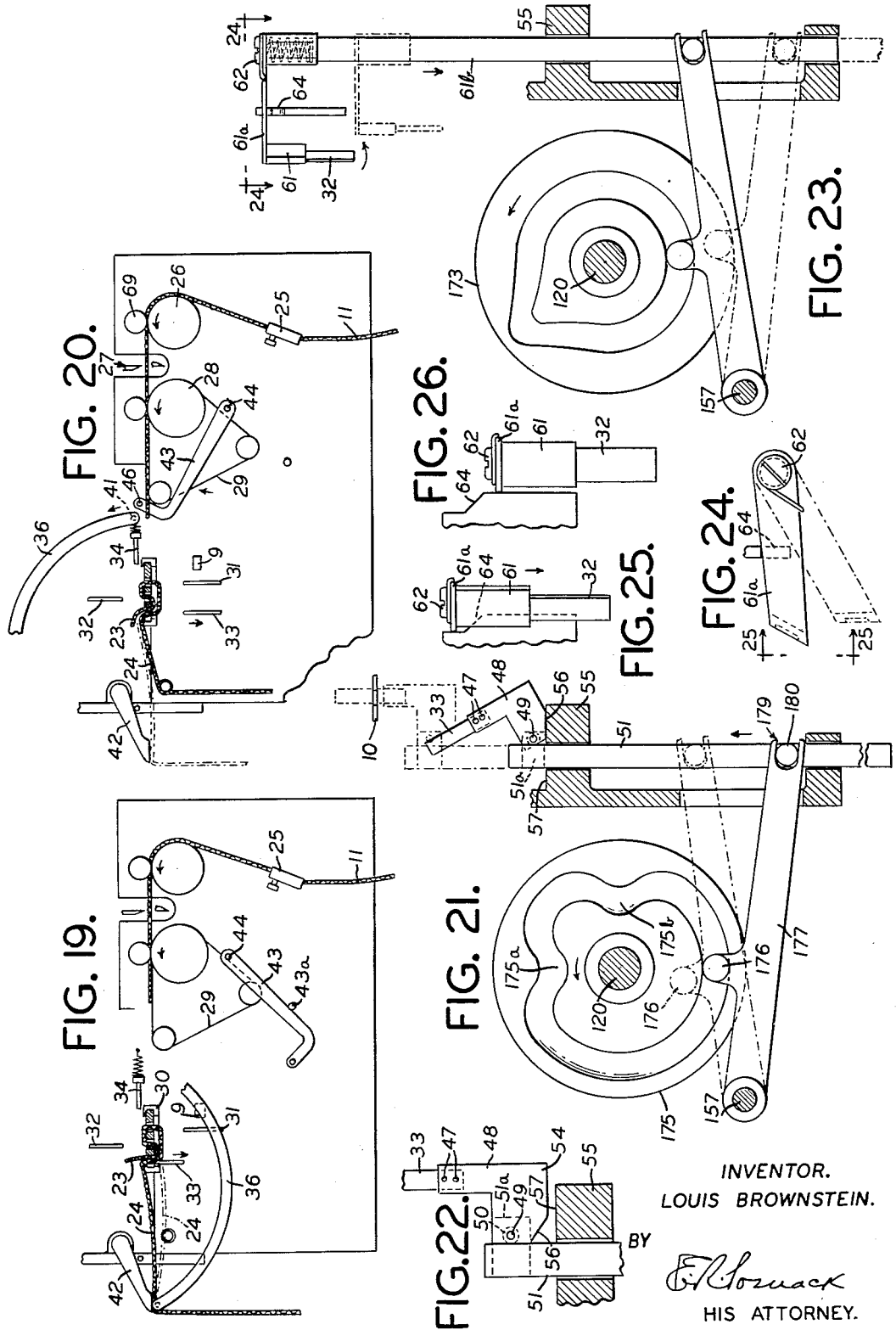
INVENTOR.
LOUIS BROWNSTEIN.
BY
HIS ATTORNEY.

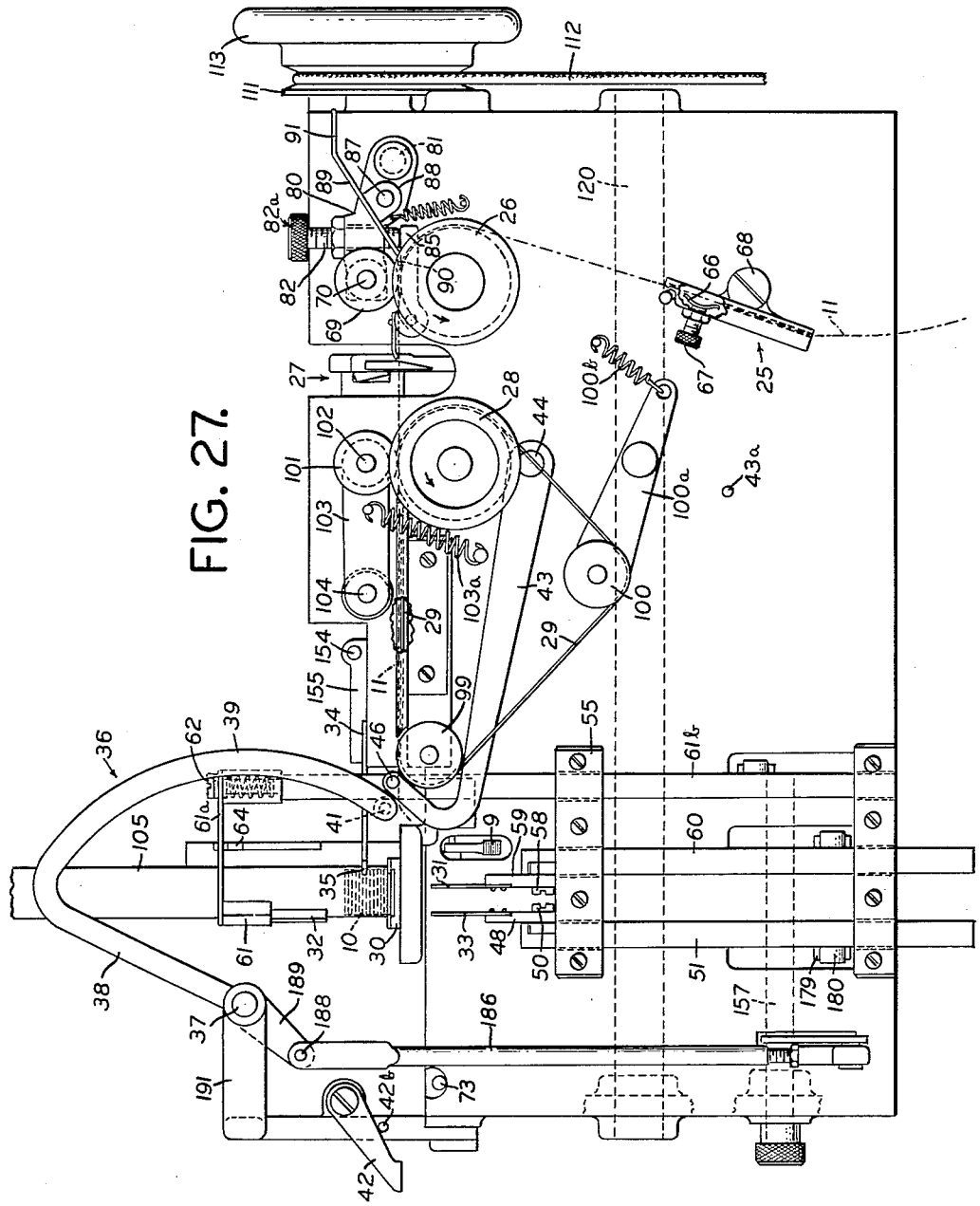

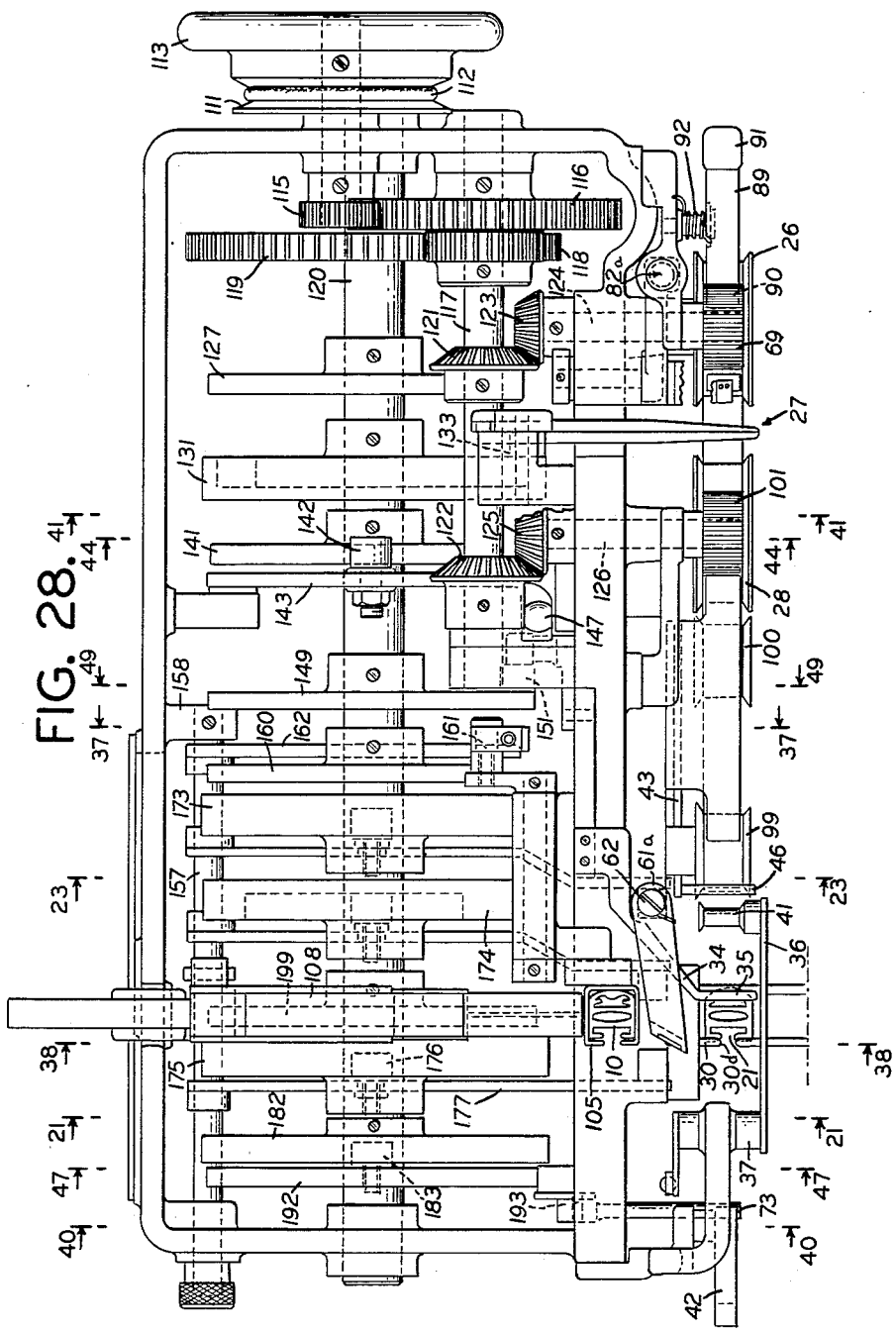

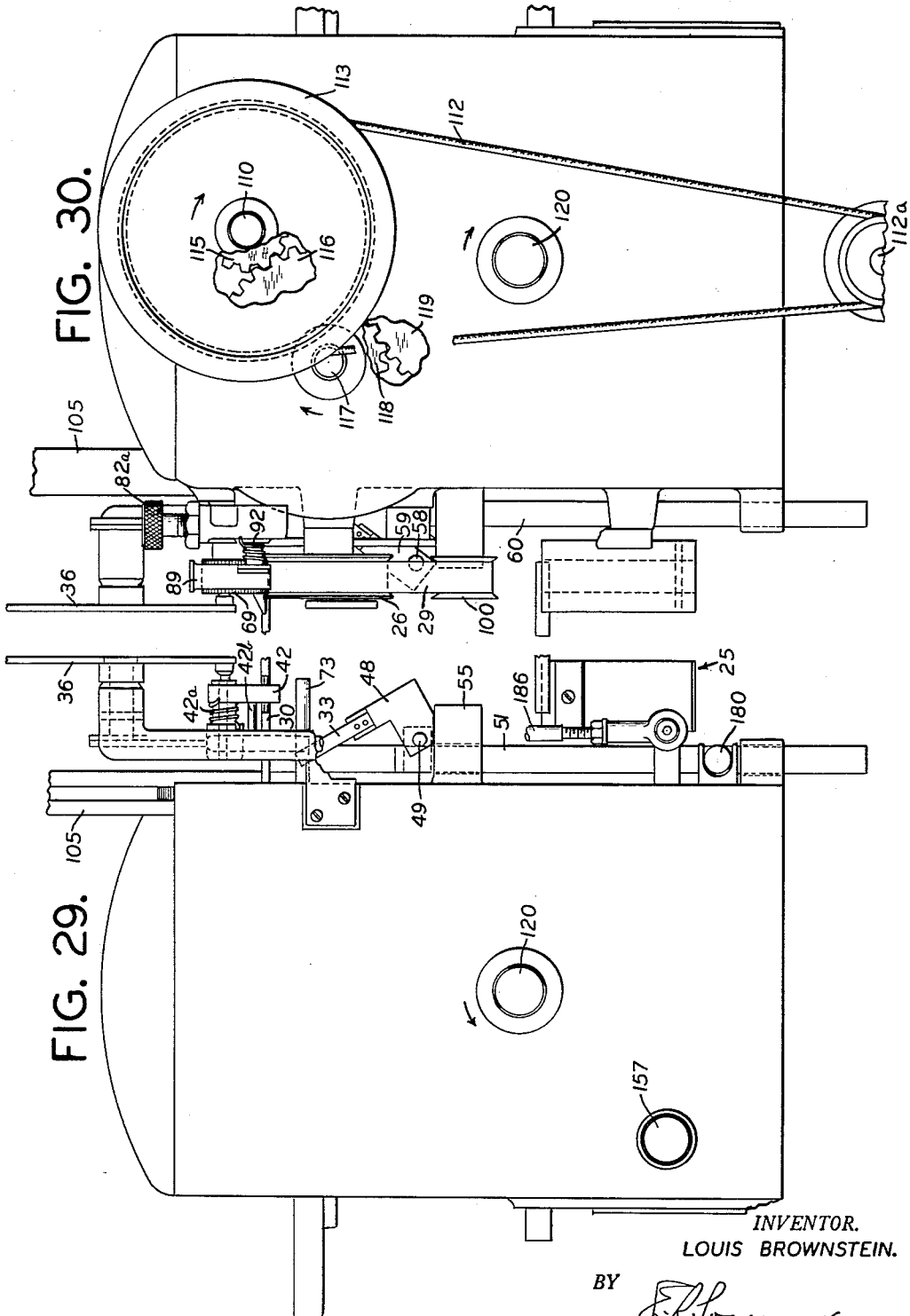

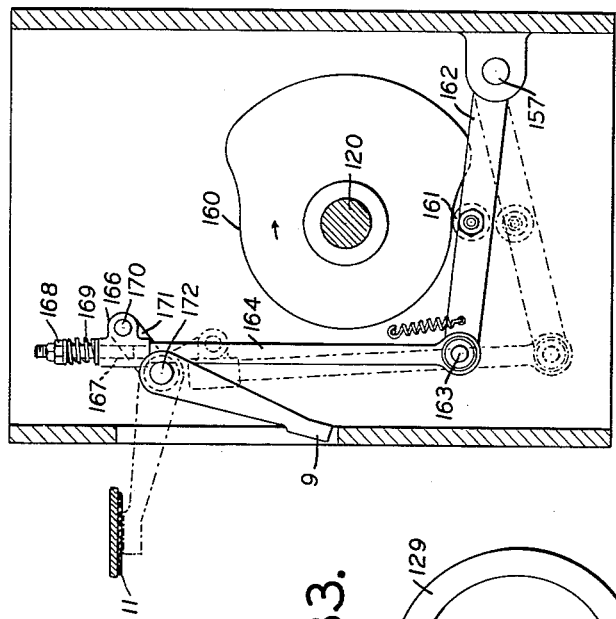
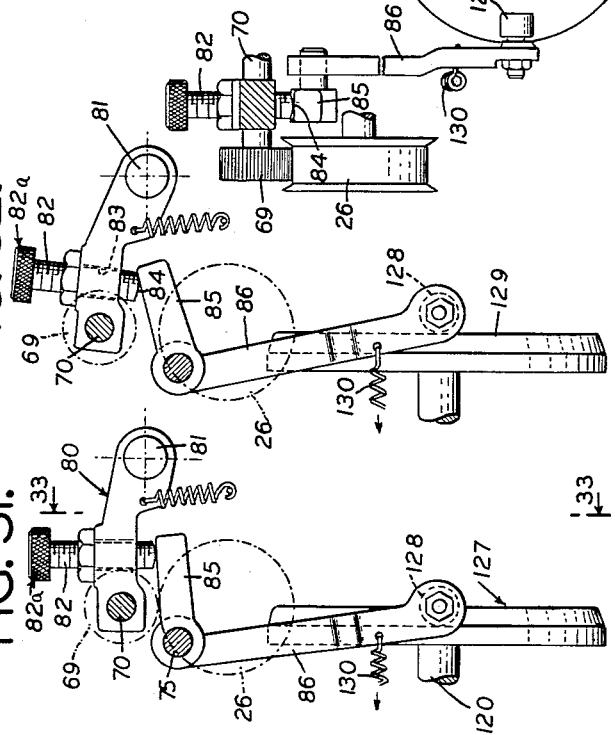
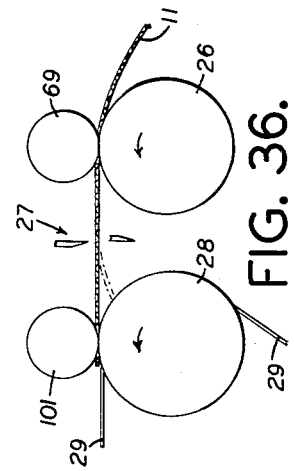
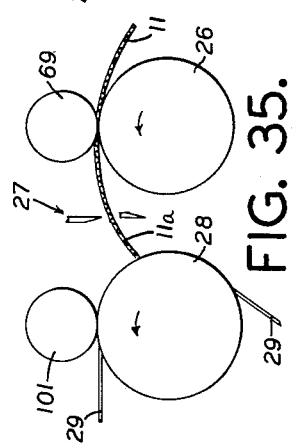
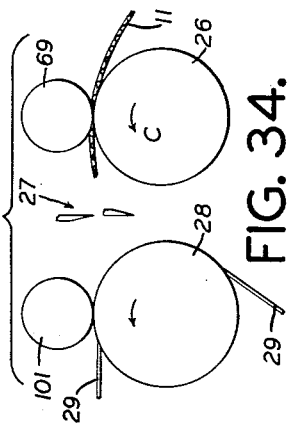
INVENTOR.
LOUIS BROWNSTEIN.
BY
HIS ATTORNEY.

Aug. 23, 1955   L. BROWNSTEIN   2,715,984
METHOD AND APPARATUS FOR THREADING BUCKLES
Filed Aug. 6, 1954   11 Sheets-Sheet 9
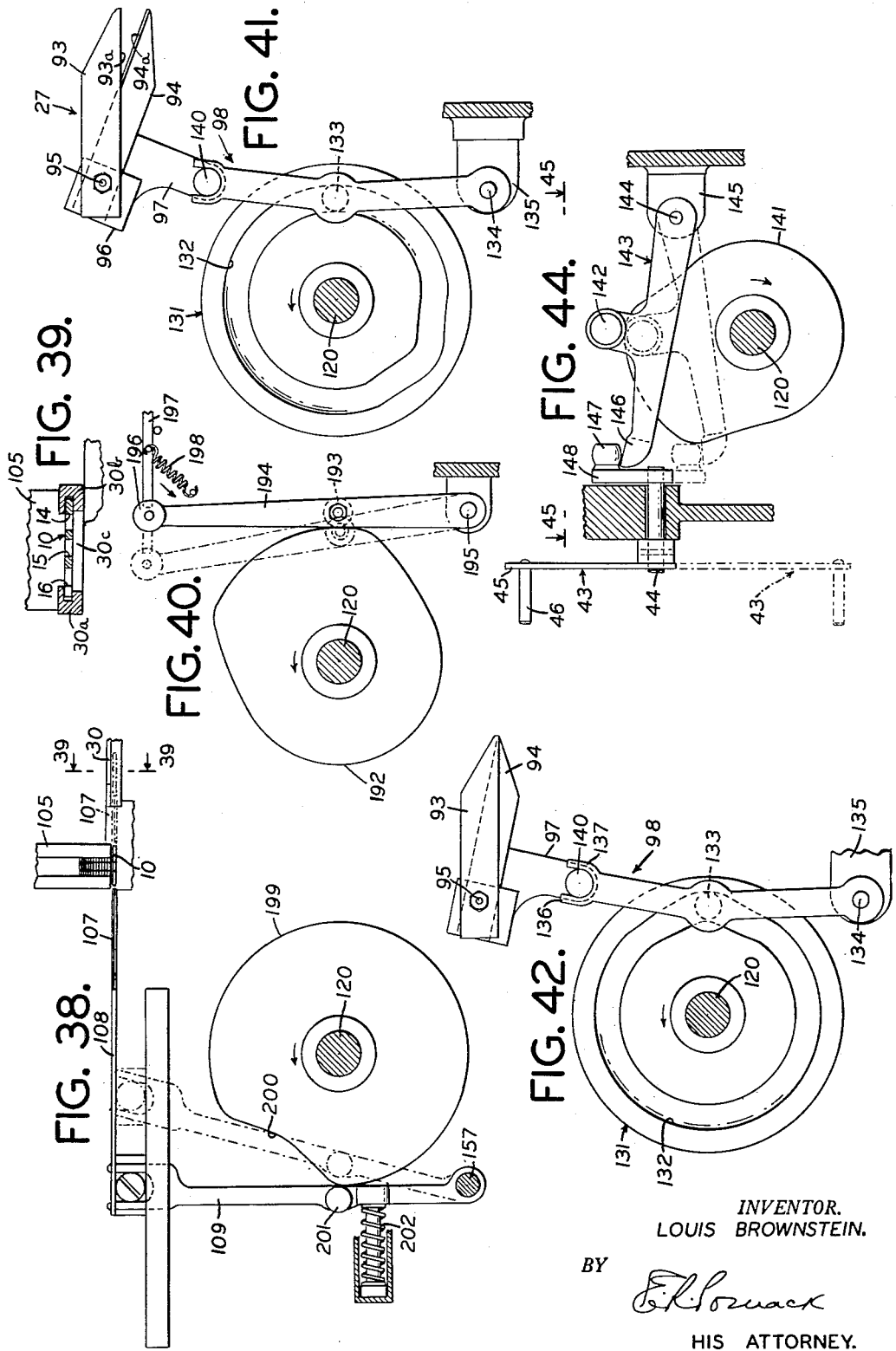
INVENTOR.
LOUIS BROWNSTEIN.
BY
HIS ATTORNEY.

Aug. 23, 1955 L. BROWNSTEIN 2,715,984
METHOD AND APPARATUS FOR THREADING BUCKLES
Filed Aug. 6, 1954 11 Sheets-Sheet 10
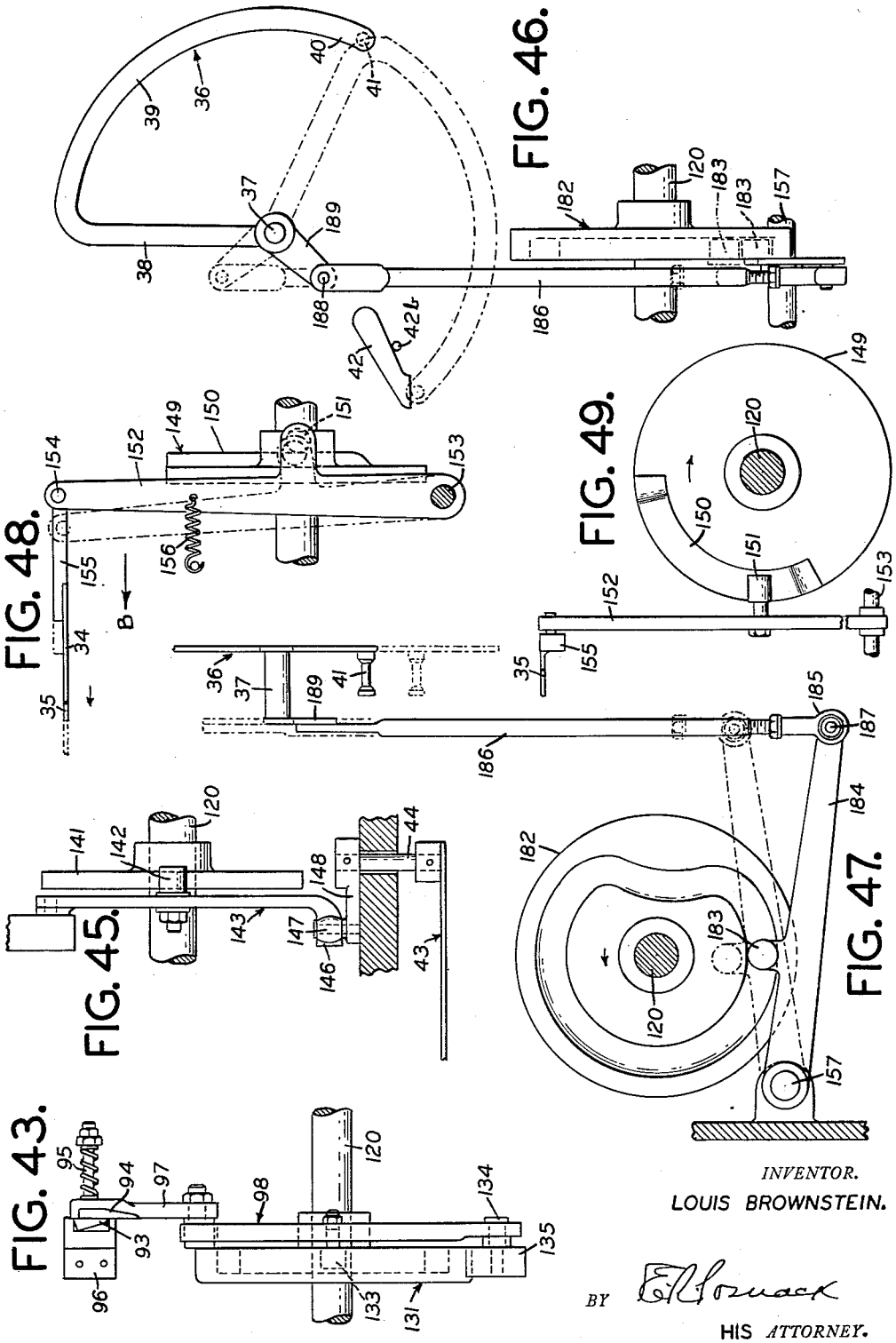
INVENTOR.
LOUIS BROWNSTEIN.
BY
HIS ATTORNEY.

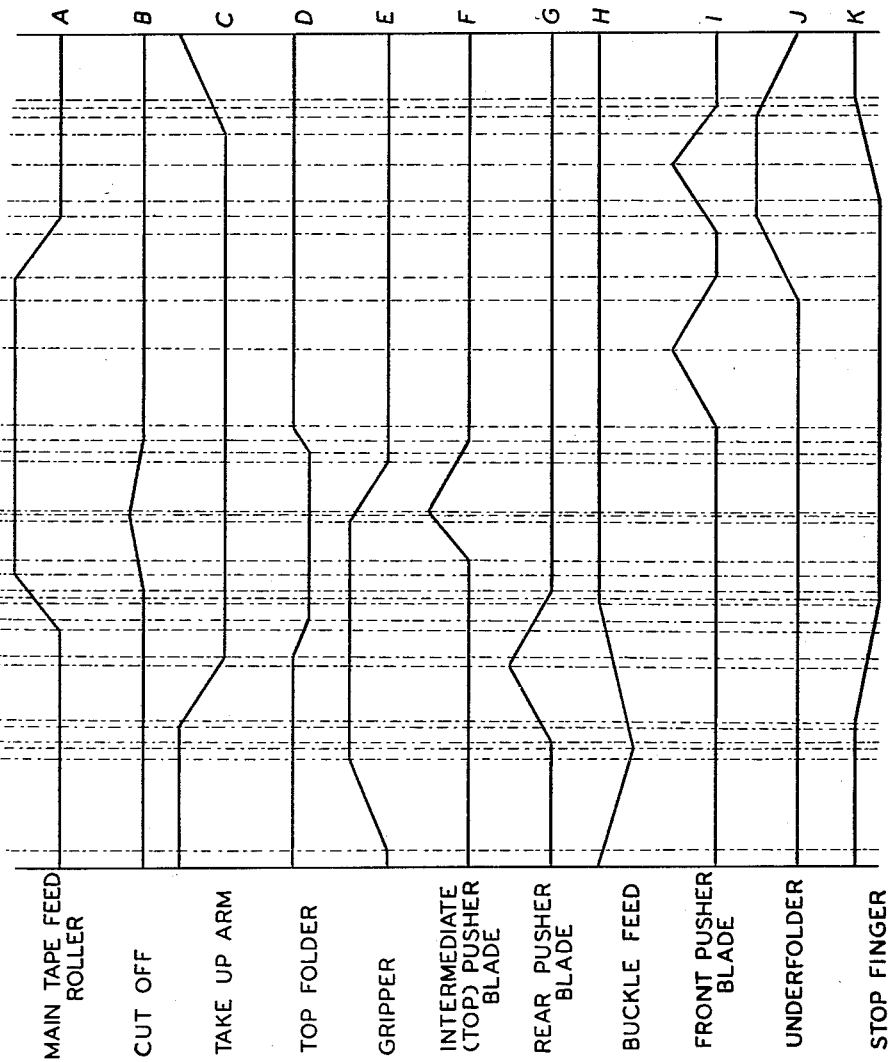

United States Patent Office 2,715,984
Patented Aug. 23, 1955

2,715,984

METHOD AND APPARATUS FOR THREADING BUCKLES

Louis Brownstein, Brooklyn, N. Y., assignor to Nasan Metal Products, Inc., New York, N. Y.

Application August 6, 1954, Serial No. 448,293

21 Claims. (Cl. 223—49)

This invention relates to the threading of buckles. More specifically, it relates to a method and apparatus for automatically effecting an assembly of a tape (or strap) and a buckle—of the type employed in various classes of garments, and in which the buckle frame contains three transverse slots with which the tape is interlaced, both the short and long ends of the tape extending through the foremost slot.

In the accomplishment of such an assembly it is necessary to cut off, from a continuous length of tape, predetermined sections of uniform length, and perform the threading operations so that the interengagement of the tape and buckle is firm, with a predetermined relationship of the long and short ends of the tape extending from the buckle. Because of these requirements and the inherent complexities of the operations, such assemblies have heretofore been performed manually. Attempts to effect the assembly automatically have been without success because of the tendency of the flexible tape to become entangled in the machinery, the difficulty of passing the long end of the tape through the front slot, and the other complexities inherent in the various threading operations.

It is the objective of my invention to provide a method and apparatus which will effectively perform the uniform interthreading and assembling of a tape and buckle of the aforesaid type. And in the accomplishment of this primary objective, it is my further objective to employ mechanisms which will operatively move through relatively short strokes, so as to make the apparatus compact and easy to handle.

It is a further object of my invention to enable the apparatus thereof to feed a continuous length of tape to a threading station, to automatically cut off predetermined lengths of tape, and to enable the threading operations to be performed with long and short ends of tape of predetermined lengths. And it is further within my contemplation to provide an apparatus that will accomplish the aforesaid objectives uninterruptedly and at a high rate of speed.

Other objectives, features and advantages will appear from the drawings and the description hereinafter given.

Referring to the drawings,

Figures 1 to 10 are fragmentary perspective views showing successive relative positions of the buckle and tape in the sequence of operations performed by the method of my invention.

Figures 11 to 20 are successive schematic elevations of the main operative elements of the apparatus of my invention, in their respective operative and retracted positions, for performing the steps suggested in Figures 1 to 10.

Figure 21 is a part side-elevational and part sectional view showing the cam mechanism for operating the front pusher blade member, the parts being shown by full lines in their operatively retracted positions, and by dot-dash lines in their operatively projected positions, the section being taken substantially along line 21—21 of Figure 28.

Figure 22 is a somewhat enlarged fragmentary side elevational view of the lower portion of the pusher member of Figure 21, shown in an upright operative position prior to being retracted inwardly to the full line position shown in Figure 21.

Figure 23 is a part side-elevational and part sectional view of the cam mechanism for operating the intermediate pusher blade member, the parts being shown by full lines in their operatively retracted positions and by dot-dash lines in their operatively projected positions, the section being taken substantially along line 23—23 of Figure 28.

Figure 24 is a fragmentary plan view of Figure 23 looking in the direction of 24—24, the dot-dash lines representing the operative position of the pusher blade and supporting bar.

Figure 25 is a fragmentary side view looking in the direction of 25—25 of Figure 24, showing the blade member in its retracted position.

Figure 26 is a view substantially like Figure 25, showing the blade member in its operative position.

Figure 27 is a front assembly elevation of the apparatus of my invention, most of the parts being shown in their retracted positions just prior to the feeding of the tape to the gripper station, that is, substantially in the position illustrated in Figure 11, the path and position of the tape being shown by a dot-dash line.

Figure 28 is a plan view of Figure 27, a buckle being shown operatively in place on the threading platform.

Figure 29 is a side elevational view of the left side of Figure 28.

Figure 30 is a side elevational view of the right side of Figure 28, fragments being removed for clarity.

Figure 31 is a front elevational view of the control mechanism for the main feed wheel roller shown at the right of Figure 27, the said roller and main feed wheel being shown by dot-dash lines, the roller being shown in operative engagement with the said wheel.

Figure 32 is a view substantially like Figure 31, but showing the roller in its inoperative raised position.

Figure 33 is a section of Figure 31 taken substantially along line 33—33.

Figures 34, 35 and 36 are schematic front elevations of the tape-cutting member flanked by the main feed wheel with its roller and the carrier wheel with its roller, a tape being shown in three stages operatively fed from the main feed wheel to said carrier wheel.

Figure 37 is a fragmentary section of Figure 28 taken substantially along line 37—37, showing the gripper actuating mechanism, the gripper and follower being shown in their retracted positions by full lines and in their operative projected positions by dot-dash lines.

Figure 38 is a fragmentary section of Figure 28 taken substantially along line 38—38, showing the buckle feeder and actuating mechanism therefor, certain of the parts being shown in their projected positions by dot-dash lines.

Figure 39 is a fragmentary section of Figure 38 taken along line 39—39.

Figure 40 is a fragmentary section of Figure 28 taken along line 40—40, showing the stop finger and actuating mechanism therefor, the dot-dash lines showing the parts in their operatively retracted positions.

Figure 41 is a fragmentary section of Figure 28 taken along line 41—41 thereof, showing the tape cutter and actuating mechanism therefor in the open or non-cutting position.

Figure 42 is a view like Figure 41, showing the cutting elements in their relative operative cutting or closed position.

Figure 43 is a fragmentary side view of Figure 42.

Figure 44 is a fragmentary section of Figure 28 taken substantially along line 44—44, showing the mechanism for operating the take-up arm, the arm being shown by full lines in its operatively raised position and by dot-dash lines in its operatively lowered position.

Figure 45 is a fragmentary plan view of Figure 44.

Figure 46 is a front elevational view of the underfolder and actuating mechanism therefor, the dot-dash lines showing the underfolder in its operatively projected position and in operative engagement with the front tape holder.

Figure 47 is a side elevation of Figure 46, and is a section of Figure 28 taken along line 47—47.

Figure 48 is a front elevational view of the top folder of my invention and actuating mechanism therefor, the dot-dash lines showing said folder and actuating arm in their operative projected positions.

Figure 49 is a fragmentary side elevation of Figure 48, and is a section of Figure 28 taken along line 49—49.

Figure 50 shows cam motion diagrams of the main operative components of my machine, illustrated to show the timed relation between the operative movements of said components.

The sequence of steps performed by the apparatus of my invention is illustrated in Figures 1 to 10—the machine components which perform the various steps being shown in other figures, to be hereinafter referred to. The buckle 10 into which the tape or strap 11 is to be operatively passed consists of a frame having sides 12 and 13 and three transverse slots, the rear slot 14, the intermediate slot 15 and the front slot 16—said slots being defined by the said sides 12 and 13 and the respective transverse bars connecting said side bars, to wit, the rear bar 17, the first intermediate bar 18, the second intermediate bar 19 and the front split bar 20 consisting of the two arms 20a and 20b forming therebetween the entrance throat 21.

As illustrated in Figure 1, the front portion of the tape 11 is forced upwardly through the rear slot 14—a loop 22 being first formed during this operation. Thereafter, as shown in Figure 3, the entire front portion 23, that is, the short end of the tape, is passed through the said rear slot 14. While this occurs, and before the next operation, said front portion 23 is restrained from dropping downwardly through said rear slot 14. Thereafter, said front portion 23 is pushed forwardly, to the position shown in Figure 4, so that it is ready for the operation shown in Figures 5 and 6. Figure 5 shows that the said short end or front portion 23 is pushed downwardly through the intermediate slot 15, this operation continuing until the entire front portion 23 has been passed through said slot, as indicated in Figure 6. In this position the said front portion 23 extends substantially horizontally, to make it ready for the next step shown in Figures 7 and 8. In these last figures, said front portion is pushed upwardly through the front slot 16, part of this operation being shown in Figure 7, and the completed operation in Figure 8. During the performance of this last-mentioned operation, the rear portion 24 of the tape, that is, the long end, is pushed forwardly horizontally in the direction of arrow S (Figure 8), and while said rear portion is held in this position, said rear portion 24 is forced upwardly through the said front slot 16. Due to the fact that said rear portion 24 is disposed in a horizontal direction, the upward movement thereof through slot 16 causes the section thereof adjacent the entrance throat 21 to pass therethrough, as clearly shown in Figure 9. Upon the completion of this step, both the short front portion 23 and the long rear portion 24 extend through the front slot 16, as shown in Figure 10. In this position the tape 11 is operatively interlaced with the buckle frame 10, the threading operation having been completed at this point.

The apparatus of my invention which performs the various steps above described comprises a feeding mechanism, a tape cutting device, and an arrangement of elements which perform the threading and folding operations (see Figures 11 to 20). The tape is first fed through a feed tension device 25 to a main tape feed wheel 26, past a cutter mechanism 27 to a tape carrier wheel 28, over a conveyor belt 29 to below the threading platform 30 (Figure 12). The various feeding mechanisms will be described further on in this specification, it being sufficient for the present to note that the tape is fed intermittently past said cutter 27 to permit the tape cutting operation to be performed, whereafter the tape is carried over the belt 29 to the threading station at said platform 30. These operations are performed by certain pushing, folding and holding mechanisms, all cam-operated and driven from a main shaft, the details of such driving mechanisms and cam arrangements to be hereinafter described.

Before the threading operations begin, a gripper member 9 is operatively swung from its lowered inoperative position shown in Figure 11 (see also Figure 37) to its substantially horizontal operative position in engagement with the underside of the tape 11, as shown in Figures 12 to 16, to hold the tape firmly in position while the various threading and folding operations are performed. The said gripper is actuated at a predetermined time with respect to the position of the tape as it is being fed to the threading station—so that when the gripper is brought into operative engagement with the tape, the length of the short front portion of the tape is established, such front portion extending forwardly beyond the said gripper (Figure 12). It is upon such front portion that the first series of operations are performed.

By a buckle feeding mechanism to be hereinafter described, buckle 10 is brought to its operative position upon platform 30, above tape 11, as shown in Figure 12 (see also Figures 28, 38 and 39). Said platform 30, in the preferred form illustrated, comprises two lateral channel-like slotted sides 30a and 30b for slidably accommodating and supporting therein the buckle, the base of said platform containing the apertured portion 30c proportioned to leave a free and unobstructed path below the three said transverse slots in the buckle, the forward portion of said platform being open at 30d (Figure 28) in registry with said throat 21 of the buckle. The buckle's position is such that it is in proper predetermined relation to three pusher members, to wit, the rear pusher blade 31 normally disposed below the buckle, the intermediate pusher blade 32 normally disposed above the buckle, and the front pusher blade 33 normally disposed below the buckle.

As the first threading step, illustrated in Figure 13, said rear blade 31 is operatively moved upwardly through the rear slot 14, thereby to push the front portion 23 of the tape up through rear slot 14. While the blade 31 is in its upper limiting position extending through said rear slot 14, and in engagement with said front portion 23 of the tape, as illustrated, the top folder 34 is projected forwardly into engagement with the tape against the blade 31, as illustrated in Figure 14. Said top folder 34, containing a horizontal transverse bar 35 (Figure 28) which extends transversely across and above the buckle, is spring-urged forwardly. The said rear pusher blade 31 is then retracted downwardly—the top folder 34 thereby frictionally holding the upwardly extending front portion of the tape from being pulled down through rear slot 14. After said rear blade 31 is retracted to the position shown in Figure 15, the folder 34, yieldably urged forwardly as aforesaid, folds the protruding tape portion 23 forwardly into overlying engagement with the front part of the buckle, the said folder bar 35 now being positioned in front of intermediate slot 15. The intermediate pusher blade 32 is then operatively moved downwardly, to enter said intermediate slot 15 and force portion 23 of the tape therethrough, to the positions shown in Figures 5, 6 and 16. Due to the folding action that was performed by top folder 34, by the drawing of the horizontal bar 35 across the upper surface of the tape portion 23, said portion assumes a generally forwardly substantially horizontal position after it is forced through the intermediate slot 15, as illustrated in Figure 6. While it is in such position, the front pusher blade 33 is operatively actuated upwardly, so that upon passing through the front slot 16, it forces the front portion 23 therethrough, to the position indicated in Figures 7, 8 and 17.

While the last operation is being performed, the underfolder 36 is set into action. This member, pivotally mounted at 37 (Figures 27, 28 and 46), is normally in the retracted position shown in Figures 17, 27 and 28. It is while the front blade 33 is being retracted downwardly to the position shown in Figure 18 that the said underfolder 36 is operatively swung downwardly and forwardly, to engage the long rear portion 24 of the tape and swing it forwardly into a substantially horizontal position, such as that shown in Figures 8, 9, 10 and 18. Said underfolder, in the form thereof illustrated in the drawings, includes an arm 38 joined to the arcuate bar 39 supporting, at the extremity 40 thereof, the inwardly extending pin 41, said pin being positioned for underlying engagement with said rear portion 24 of the tape, as indicated in Figures 18 and 28. As the said underfolder 36 operatively moves forwardly, the said pin 41 is brought into engagement with said rear portion 24, so that when it is in its extreme forward operative position, the said portion 24 of the tape is maintained in a substantially horizontal position in a position above the front pusher blade 33, the front portion 24a thereof being spaced forwardly from platform 30 and substantially at the level of the buckle 10. As the next step, said pusher blade 33 is again moved upwardly (Figure 19), thereby engaging the underside of rear portion 24 of the tape and forcing it upwardly through the front slot 15. During this operation, said portion is moved upwardly from its dot-dash to its full line position shown in Figure 19, whereby the portion of said long end 24 adjacent the entrance throat 21 of the buckle is forced upwardly and inwardly through the throat, as illustrated, so that when the front pusher blade 33 has reached its upper position, said long end 24 of the tape is above the upper surface of the buckle, in the position shown in Figures 10 and 19. Because of the holding action of underfolder 36, the operative movement of said long end 24 into front slot 16 was effected by the relatively short stroke of pusher blade 33. After this operation, the threading and assembling operations have been completed.

In the particular form of apparatus illustrated, a tape holding finger 42 is yieldably maintained by spring 42a (Figure 29) against stop 42b—the arrangement being such that said finger is in engagement with the upper portion of rear portion 24 of the tape while it is being operatively held in position by pin 41 of underfolder 36, thereby preventing a disengagement of said rear portion from the underfolder while front pusher blade 33 is operatively moving upwardly. In order to prevent the relatively long rear portion 24 from swinging back towards the pusher blades and becoming entangled therewith, a stop finger 73 is propelled outwardly after the other folder 36 is operatively retracted from its holding position shown in Figure 19 to its retracted position shown in Figure 20. Such stop finger 73 (see also Figure 40) in its projected position engages the underside of the rear portion 24 of the tape, as illustrated in Figure 24, and holds it against further rearward movement until the buckle and tape assembly is operatively removed from the apparatus.

When the front pusher blade 33, underfolder 36 and stop finger 73 are operatively retracted, the apparatus is in position for the next sequence of steps after another buckle is operatively fed onto the operating platform 30 from the hopper 105, to be hereinafter described.

To maintain the tape under sufficient tension at the beginning of the threading operation, and also to enable the underfolder 36 operatively to engage the rear portion 24 of the tape, a take-up arm 43 is employed (Figures 44 and 45). This is pivotally mounted at 44, the arm containing at the forward terminal 45 thereof an outwardly extending pin 46 positioned to bear against the tape 11 as it leaves the belt 29 (see Figures 11 and 12). The arrangement is such that the take-up arm is free to swing downwardly under its own weight during the time it serves its operative function, so that the pin 46 presses downwardly upon said tape as it is being fed forwardly—the take-up arm 43 being in its lowermost position, as shown in Figure 16, when the arm reaches the stop 43a. The arrangement is such that a downwardly extending loop 24a is formed as the feed of the tape continues, the take-up arm 43 holding the loop under tension, as aforesaid, for a substantial portion of the feeding movement. After the completion of the feeding movement, the rear portion 24 of the tape gravitationally extends downwardly, as shown in Figure 17. Thereafter the underfolder swings forwardly, to carry the rear portion 24 forward, in the manner above described, and as indicated in Figure 18.

After the completion of the threading operation as herein above described, the said take-up arm is retracted to bring its pin 46 to its inoperative position shown in Figures 20 and 27—above the level of the line of travel of the tape, that is, above belt 29. The pin 41 of the underfolder 36 is similarly positioned above the belt 29, when it is in its inoperative position. As hereinabove indicated, the respective pins 41 and 46 of the underfolder 36 and take-up arm 43 are both directly movable across the path of travel of the said tape as the latter moves forwardly towards the threading station of the machine.

It will be observed from Figures 28, 29 and Figures 21 to 26 that when the pusher blades 31, 32 and 33 are in their respective retracted positions, they are disposed inwardly with respect to the position of the slots 14, 15 and 16 of the buckle. They are so positioned, when in their inoperative positions, that they will be out of the path of movement of the top folder 34 and the underfolder 36. The pusher blade 33 is attached by rivets 47 to block 48 which is pivotally mounted over the shank 49 of screw 50 carried by the extension 51a of the vertical pusher bar 51. The pivotal mounting 49 is so positioned with respect to the center of gravity of the block 48 that normally the block will be maintained in the vertical position shown in Figure 22 and in the dot-dash position of Figure 21, in which position blade 33 is also vertical. However, when the pusher bar 51 is operatively brought downwardly substantially into its lowermost operative position of Figure 22, the outwardly extending portion 54 of the block, outwardly offset with respect to pivotal point 49, will engage the outwardly extending lug 55, resulting in an inward tilting of the block 48 to the position shown in Figure 21, the inwardly bevelled surface 56 coming into resting engagement with the upper surface 57 of said lug 55. This will maintain the block 48 in the tilted position, whereby the blade 33 is also tilted inwardly towards the machine, as shown in Figure 21. Blade 31 contains a similar arrangement, including the screw 58, block 59 and the pusher bar 60 to which the screw 58 is attached.

The upper pusher blade 32 (Figures 23 to 26) is attached to block 61 suspended from horizontal cross-bar 61a pivotally mounted over the shank of screw 62. The normal yieldably retracted position of the bar 61a and blade 32 is as illustrated by their respective full-line representations in Figures 23 and 24, and in Figure 25. As the blade 32 is operatively moved downwardly, bar 61a engages the downwardly and outwardly sloping surface of cam 64, and is operatively rotated outwardly into the operative position, as illustrated by the dot-dash lines of Figures 23 and 24, and in Figure 26. Upon an upward retraction of intermediate pusher bar 61b and intermediate pusher blade 32, the bar 61a moves above and out of engagement with cam 64, whereby blade 32 assumes its inner retracted position—out of the path of the top folder bar 35 and pin 41 of underfolder 36 (see Figure 28).

In the feeding of the device, the tape 11 (see Figures 11, 27) slidably passes upwardly through the feed tension device 25, the spring 66 of which slidably engages the tape with a predetermined yieldable pressure, as determined by the position of the screw 67 the terminal of which is in operative engagement with said spring. Said feed tension device 25 is pivotally mounted at 68, to provide for adjustments in the position of the path of the tape. After the tape passes the feed tension device 25, it engages the upper periphery of main feed wheel 26, in underlying engagement with the serrated roller 69 which yieldably bears downwardly upon the tape and wheel 26 (Figures 31–33). The said roller 69 is rotatably mounted on shaft 70 attached to frame 80 pivotally mounted over shaft 81. Extending through the frame 80 is the shank 82 of adjusting screw 82a, said shank 82 being in threaded engagement with the internally threaded aperture 83 of said frame, the lower portion 84 of the shank being in abutment with the arm 85 of the pivotally mounted follower member 86, to be hereinafter described. Pivotally mounted at 87 of frame 80 (Figures 27, 28) is the bracket 88 carrying the spring finger 89, the lower terminal 90 of which is in engagement with the tape 11 disposed over the feed wheel 26. Said terminal 90 serves to hold and guide the tape 11 as it moves forwardly. By depressing the upper portion 91 of member 89, it can be disengaged from its bearing pressure against the tape 11. As will be noted, the said finger 89 is yieldably maintained against the tape 80 by the spring 92 secured to frame 80.

When the follower member 86 is operatively actuated, in a manner to be hereinafter described, the said arm 85 will engage the terminal 84 of adjusting screw 82a and cause a pivotal upward clockwise rotation of frame 80, together with roller 69, to the position indicated in Figures 32 and 15–17. Upon such upward movement of the frame 80, the said roller 69 becomes disengaged from the tape 11, and effects a discontinuance of the feed towards the wheel 28, in a manner which will be hereinafter described. By operative adjusting movements of screw 82a, the time of contact of arm 85 with the shank 82 of said screw can be preset, thereby determining the point at which the feed is discontinued, and thereby determining the length of the tape sections being fed toward the threading station.

As will be seen from Figures 28, 41 and 42, the tape cutter 27 consists of two main components, a stationary cutting blade 93 and a movable cutting blade 94, the latter being pivotally mounted at 95. The arrangement is such that upon an upward pivotal movement of the cutting blade member 94, the cutting edge 94a thereof will come into engagement with the cutting edge 93a of stationary member 93, to effect a cutting action, substantially in the manner of conventional scissors. The said movable member 94 is mounted upon block 96 which carries the arm 97, the latter being operatively actuated by a follower arm 98 in a manner to be hereinafter described. Suffice it to say, for the present, that the feeding movement effected by the main tape feed wheel 26 and roller 69 is discontinued before the tape cutter 27 is operatively actuated, so as to permit the said cutting action to occur while the tape is stationary.

The tape carrier wheel 28 is in effect a pulley which, in cooperation with pulley 99 and take-up roller 100 operatively supports the moving belt 29 (Figures 27, 11)—said take-up roller 100 being carried by the pivotally mounted arm 100a urged in a counterclockwise direction by spring 100b. The serrated roller 101, rotatively mounted at 102 upon arm 103 which in turn is rotatively mounted at 104, is yieldably urged down upon roller 28 by spring 103a.

After tape 11 has operatively passed the open tape cutter 27 (see Figures 34–36), the leading terminal portion 11a will extend forwardly and slightly downwardly to engage the belt 29 disposed over the wheel 28. Due to the rotation of the wheel 28 in the direction of arrow C, the said terminal portion 11a will be raised from the dot-dash position of Figure 36 and carried upwardly by the moving belt until it engages the roller 101, the operative movement of the belt 29 forwardly causing a forward operative conveying of the tape. The tape is thus operatively carried forwardly towards the threading station of the machine. It is to be noted that the entire length of tape between rollers 28 and 99 is supported by belt 29, so as to effect an actual carrying rather than pushing of the tape forwardly. This prevents any buckling of the tape after it passes the wheel 28. It is preferred that the diameter of wheel 28 be slightly larger than that of wheel 26, so that the peripheral speed of wheel 28 is correspondingly greater than that of wheel 26. The arrangement is hence such that there will always be a pull on the tape leaving wheel 26 by virtue of the feeding action of roller 101 in cooperation with wheel 28 and the conveyor belt 29. Such a pull will cause a slight slippage between the belt 29 and the tape carried thereby, a condition which will provide a straight and unwarped length of tape between the wheel 26 and roller 99, thereby insuring tapes of uniform predetermined lengths.

It is important for the most effective operation of this apparatus that the tension exerted on tape 11 by the feed tension device 25 be greater than the pull exerted on the tape by the roller 101 and carrier wheel 28—a condition which can readily be effected by an adjusting manipulation of screw 67. Under such conditions, when roller 69 is operatively raised, in the manner above described, there is a direct connection between the tape after leaving the feed tension device 25 and the wheel 28; and since as aforesaid, the tension in tape 28 effected by tension device 25 is greater than the forward feeding action of the roller 101 and wheel 28, there will be a discontinuance of feeding action when roller 69 is raised. In other words, upon the mere operative raising of roller 69, the downward or resisting pull of the feed tension device 25 against the feeding action of tape carrier wheel 28 and associated parts will cause a discontinuance of the feed.

The feeding of the buckles is effected through a hopper 105 into which buckles are placed so that they are vertically stacked, said hopper being disposed above the level of platform 30. A buckle feed finger 107 (Figure 38), disposed inwardly of said hopper 105, is adapted to be moved from an inner retracted position to a projected position shown by dot-dash lines in Figure 38. The said finger is carried by an arm 108 which is operatively actuated by follower arm 109, in a manner to be hereinafter described.

From the above description it is apparent that a continuous length of tape 11 is fed through the feed tension device 25 over a main tape feed wheel 26 and under a coacting roller 69 towards the tape cutter 27, said tape cutter permitting the passage therepast of the tape under the feeding influence of said main feed wheel 26 and associated parts, said tape being operatively passed over the conveyor belt 29 which carries it forwardly towards the operative threading portion of the machine—there being structural parts of the machine supporting the various wheels and rollers the details of which need not be described herein, since they are well understood by those skilled in the art, and since a detailed description thereof is unnecessary for an understanding of the present invention. It is to be noted, however, that the path of feed of the tape 11 is at a level as defined by the belt 29, this being somewhat below the level of the operating platform 30.

The drive for the apparatus of my invention is effected through a main shaft 110 on which is mounted a pulley 111 connected by belt 112 to a suitable drive shaft 112a (Figures 28, 29, 30). Also attached to said shaft is the hand wheel 113, enabling the main shaft to be manually operated. Mounted on said main shaft is the gear 115 in engagement with gear 116 on counter-shaft 117, the latter carrying a gear 118 in engagement with gear 119 fixedly mounted on cam shaft 120. Said counter-shaft 117 carries thereon two bevel gears 121 and 122, the former being in operative engagement with bevel gear 123 operatively connected through shaft 124 with the main feed wheel 26, and the latter being operatively engaged with the bevel gear 125 attached to shaft 126 operatively connected to the tape carrier wheel 38. It is hence apparent that the operative rotation of the main shaft 110 causes the operative rotation of the bevel gears 123 and 125, and of the corresponding feed wheel 26 and 28, respectively.

Fixedly mounted on cam shaft 120 are cams operatively engaged with various mechanisms connected with the threading operations hereinabove described. The operative connections between said cams and their respective actuating members will be separately described.

Cam 127 is the main feed cam for operatively lifting the said roller 69 (Figures 31–33). The said follower member 86, connected to said arm 85, carries on the roller 128 which is in engagement with the elevating portion 129 of the said side plate cam 127. When roller 128 comes into engagement with said elevation portion 129, it causes an operative rotation of the feed follower member 86 about shaft 75, whereupon said arm 85 is operatively raised to cause its engagement with the shank of said adjusting screw 82a, stopping the feed in the manner above described. The spring 130 urges said follower member 86 to return to its normal inoperative position shown in Figure 31, after roller 128 is out of engagement with said elevating portion 129 of said cam.

The cut-off cam 131 is of the groove or box type, the grooved portion 132 of which is in engagement with the roller 133 carried by the follower arm 98 pivotally mounted at 134 on bracket 135. The upper portion of said follower arm 98 is bifurcated, the two arms 136 and 137 of which are in flanking and operative engagement with the pin 140 carried by said arm 97 connected with the movable cutting member 94. Upon an operative rotation of the cam to a position where the roller 133 is at the high point thereof, as shown in Figure 42, the follower arm 98 is moved to cause a corresponding operative or cutting movement of member 94, to cut the tape passing between member 94 and the stationary cutting member 93. Upon a continued rotative operation of said cam 131, the follower arm 98 is retracted, as shown in Figure 41, and the movable cutting portion 94 is correspondingly retracted.

The take-up arm cam 141 (Figures 44 and 45) is in operative engagement with the roller 142 of the take-up follower 143 pivotally mounted at 144 on bracket 145, the terminal 146 of said follower arm being in engagement with knob 147 of arm 148 attached to and extending from shaft 44 upon which is fixedly mounted the take-up arm 43. As said follower arm 43 operatively moves to the full-line position shown in Figure 44, when roller 142 reaches its high point, the take-up arm 43 is in its operatively retracted position, shown in Figures 11, 12 and 27. After roller 142 leaves its high point, said take-up arm 43 is released, permitting the pin 46 of said arm to bear down upon the tape, in the manner above described.

The cam 149 for controlling the top folder 34 (see Figures 48 and 49) contains a side plate elevating portion 150 in operative engagement with the roller 151 carried by the arm 152 rotatively supported at 153, the upper portion of the arm being pivotally secured at 154 to bar 155 carrying the said top folder member 34. A spring 156 is in engagement with folder arm 152, and normally urges it in the direction of arrow B, bringing follower arm 152 to its dot-dash position of Figure 48 and the top folder 34 into its operative position, by spring urged action. Upon an operative rotation of the cam to a point where the roller 151 is in engagement with the said high point of cam 149, the upper folder 34 is operatively retracted to the position shown in full line in Figure 48 and Figure 11.

A number of other cams are operatively associated with the follower shaft 157, said shaft having rotatably mounted thereover a plurality of follower arms each operatively connected to a cam for operating certain of the threading members (see Figure 28)—said shaft 157 being fixedly mounted to bracket 158 affixed to the casing of the machine.

The gripper cam 160 (Figure 37) is in operative engagement with the roller 161 carried by follower arm 162 mounted on said follower shaft 157. One end of said follower arm 162 is pivotally attached at 163 to the connector member 164 the outer terminal of which carries a bracket 166 into which extends an end rod 167 carrying at the outer end thereof the nut 168. Between nut 168 and bracket 166 is the spring 169. Pivotally mounted at 170 of bracket 166 is the arm 171 fixedly attached to the shaft 172 upon which is fixedly mounted the gripper arm 9. The arrangement is such that when the roller 161 is operatively moved to the high point of cam 160, as shown by the dot-dash lines of Figure 37, follower 162 will move downwardly and carry with it connector 164, thereby causing bracket 166 to move down, whereupon arm 171 rotates in a clockwise direction about the axis of shaft 172. Since said axis is fixed, such clockwise rotation of arm 171 will cause a similar clockwise rotation of gripper 9, to bring it to the operative gripping position shown by the dot-dash lines of Figure 37. Due to the spring 169, the gripping action of gripper 9 is yieldable, thereby providing a firm grip, yet one which is adjustable to variations that may be due to wear and tear.

The three pusher cams for the pusher blades, to wit, intermediate pusher cam 173, rear blade pusher cam 174 and front blade pusher cam 175, are of the box type of cam in engagement with rollers to obtain positive follower arm movements. Each of these is actuated by a follower arm mounted on said follower shaft 157; and the description of the follower construction of one will suffice to explain the operation of the corresponding parts of the others. The cam 175 (Figure 21) is shown operatively engageable with the roller 176 attached to the follower 177 mounted over follower shaft 157, the forward bifurcated portion 179 of which is in operative engagement with the pin 180 attached to the pusher bar 51 of the front pusher blade 33. When the follower roller 176 reaches the first high point 175a of cam 175, it will be in the dot-dash line position shown in Figure 21, at which point the follower arm 177 is raised, to correspondingly raise the pusher bar 51. The retraction is accomplished when the cam 175 is in a position where the roller 176 is in operative engagement with the low point of the cam surface. In the case of said cam 175, containing a second high point 175b, the elevation of pusher bar 51 is repeated, to raise the pusher bar 51, and correspondingly elevate front pusher blade 33—whereby said latter blade performs two tape threading operations per cycle, in the manner hereinabove explained. In similar fashion the pusher bars of the rear pusher blade 31 and intermediate pusher blade 32 are operated, except that in the case of said latter blades there is but one operative stroke, and hence one high point in their cams. In the case of the intermediate pusher bar, when the roller reaches the high point, the said pusher bar is in its raised position, and the pusher blade 32 is in its inoperative or raised position.

The underfolder cam 182 (Figures 46 and 47) is also the box type, its grooved portion being in operative engagement with the roller 183 carried by the follower arm 184 pivotally supported by follower shaft 157. The outer terminal 185 of follower arm 184 is pivotally connected to the connector rod 186, the pivotal point being at 187. The upper portion of connector rod 186 is pivotally connected at 188 to arm 189, the latter being fixedly mounted on shaft 37 carried by bar 191 (Figure 27), arm 189 being fixed relative to said arm 38 of the underfolder 36. Hence, upon up and down operative movements of connector rod 186, through the action of cam 182, the said underfolder 36 is operatively movable between its full-line retracted position of Figure 46 and its operative projected position shown by dot-dash lines in said figure.

The stop finger cam 192 (Figure 40), shown as a plate cam, is operatively engageable with the roller 193 carried by the connector follower arm 194 pivotally mounted at 195, the upper terminal 196 of the follower arm being engageable with the stop finger 197 against the action of spring 198. When the follower arm 194 is in its operatively projected full-line position of Figure 40, the said stop finger 197 will be in its projected position—in which position it is in intercepting relation with the rear portion 24 of the tape 11, in the manner above described.

The buckle feed cam 199 (Figure 38) is a plate cam having a peripheral cam surface containing the depressed portion 200. Operatively engageable with said peripheral portion is the roller 201 carried by the follower arm 109, the latter being rotatably mounted on shaft 157. A spring 202 urges the follower 109 towards cam 199. The arrangement is hence such that when the follower 201 is operatively urged inwardly towards the depressed portion 200 of cam 199, the follower 109 will assume the dot-dash position shown in Figure 38, thereby urging the buckle feed finger 107 to its projected position shown by dot-dash lines. The parts are so proportioned that when said finger is in its outermost projected position, a buckle operatively engaged thereby will be moved to the threading station at platform 30.

The relation of the cam settings of the various cams clearly appears from Figure 50—the relative positioning of the limiting points of the cams indicating the sequence of operations. This figure shows eleven timing diagrams of the various cams controlling the movements of the main operative mechanisms of the machine. Each diagram is represented by a letter of the alphabet. Diagram A relates to the main tape feed wheel cam 127, diagram B to the tape cutter control cam 131, diagram C to the cam 141 for the take-up arm, diagram D to cam 149 for the top folder, diagram E to cam 160 for the gripper, diagram F to cam 173 for the intermediate pusher blade, diagram G to cam 174 for the rear pusher blade, diagram H to cam 199 for the buckle feed, diagram I to cam 175 for the front pusher blade, diagram J to cam 182 for the underfolder, and diagram K to cam 192 for the stop finger.

A study of the relative operative positions of the various cams, as shown on Figure 50, indicates that the main tape feed wheel 26 (with roller 69) starts its feeding action while the tape cutter 27 is in its inoperative position, that is, when the two scissor blades 93 and 94 are separated to permit the tape to pass therebetween. Just before the cutting action begins the roller 69 is operatively raised by cam 127, so that the feed is discontinued and the tape is stationary while the cutting action takes place. The said roller 69 is in its upper (non-feeding) position for a predetermined period of time, the feeding action beginning some time after the cutting action has been completed and the cutting blade 94 retracted by the tape cutter cam 131.

The take-up arm is in its raised or inoperative position while the gripper 9 is coming into engagement with the tape, the said take-up arm being operatively lowered while the rear pusher blade 31 is moving upwardly—the take-up arm being entirely released after said rear pusher blade 31 has reached its uppermost position. Thereafter the take-up arm is in free resting engagement upon the tape, and remains in that position until the front pusher blade 33 begins returning downwardly from its second operative movement (after having pushed upwardly the rear portion 24 of the tape).

The top folder 34 is held in its retracted position by the cam 149 until after the said rear pusher blade 31 has reached its top position, said top folder being released by said cam towards its projected position where it remains until the intermediate pusher blade 32 is retracted upwardly into its inoperate position.

The said gripper 9 comes into pressing engagement with the tape just before the rear pusher blade 31 begins its upward movement, said gripper being released substantially at the time the intermediate pusher blade 32 reaches its lowermost operative position. It is at this position that the tape is looped about the first intermediate bar 18 and held frictionally against movement.

Each of the pusher blades, as is clearly indicated by the diagram, is in operative movement only while the other two are stationary. The operative movement of the intermediate pusher blade 32 begins immediately after the rear pusher blade 31 is fully retracted; and the first operative movement of the front pusher blade 33 begins immediately after the intermediate pusher blade has completed its operative movement—the second operative movement of the front pusher blade starting a short interval after said blade has completed its first operative stroke.

The buckle feed finger 107 starts its feeding movement before the rear pusher blade 31 begins its movement, said finger reaching its final operative position just before the rear pusher blade 31 starts upwardly, so that the buckle will be operatively in place over the tape when said rear pusher blade begins to move upwardly.

The underfolder 36, actuated by cam 182, begins to swing below the tape into the operative position while the front pusher blade 33 is returning from its first operative stroke—said underfolder reaching its extreme operative position just about the time the front pusher blade 33 begins its second operative stroke. The underfolder is maintained in its extreme operative position substantially until the front pusher blade reaches its fully retracted position after its second operative stroke—the underfolder returning to its fully retracted position above the tape just before the gripper begins moving upwardly, and substantially at the same time that the take-up arm has reached its uppermost position above the tape. The stop finger 43 is projected into its outermost position while the underfolder is being retracted—said finger being maintained in its projected position substantially until the time the rear pusher blade begins its upward movement in a new cycle.

From the above description of the relative position of the various actuating elements of the apparatus, it is apparent that there is a predetermined sequence of events which permit the functions of my novel apparatus to be uninterruptedly and effectively performed.

The main concept of the threading method and apparatus of my invention involves the bringing of the front portion of the tape to a position where it extends across the buckle, successively passing said front portion through the slots thereof, then bringing the rear portion of the tape to a position where a portion thereof extends across the buckle, and passing said rear portion through one of said slots. In the preferred method illustrated the said front and rear portions of the tape are brought below the buckle; but my invention is not limited to the particular illustrated aspect thereof. The invention is equally applicable to other aspects thereof which are the mechanical equivalents of the preferred embodiment described—such as the bringing of said front and rear portions above rather than below the buckle, whereby the pushing or threading operations are reversed. Similarly, the invention is not limited to a horizontal feed of the tape, since the above-described method and apparatus can be applied, within the scope of my invention to a vertical feed, for example. The invention has accordingly been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a method of threading a flexible tape through and into engagement with a buckle having a rear slot, an intermediate slot and a front slot, the steps of positioning said buckle at a predetermined threading station, feeding a continuous length of said tape forwardly past a predetermined cutting station, conveying the portion of said tape in front of said cutting station forwardly, discontinuing said feeding action, severing said tape at said cutting station, conveying the severed portion of the tape in front of said cutting station along a predetermined line of feed toward said threading station, and during said last-mentioned conveying step bringing a predetermined front portion of the tape below said buckle, pushing said front portion upwardly through said rear slot to a position above the buckle, pushing the upwardly extending front portion downwardly through said intermediate slot to a position below the buckle, pushing the downwardly extending front portion upwardly through said front slot to a position above the buckle, carrying the rear portion of the tape forwardly underneath the buckle, and pushing said rear portion upwardly through said front slot.

2. In an apparatus for threading a flexible tape through and into engagement with a buckle having a rear slot, an intermediate slot and a front slot, the combination of a threading platform for operatively supporting said buckle, tape feeding means moving towards said platform along a predetermined feed line, said platform being above the foremost portion of said feed line, a movable rear pusher blade normally in an operatively retracted limiting position below said platform and below the rear slot of said buckle when operatively disposed thereon, and positioned for movement upwardly through said rear slot into an operatively raised limiting position, a movable intermediate pusher blade normally in an operatively retracted limiting position above said platform and above the intermediate slot of said buckle, and positioned for movement downwardly through said intermediate slot into an operatively lowered limiting position, a movable front pusher blade normally in an operatively retracted limiting position below said platform and below the front slot of said buckle, and positioned for movement upwardly through said front slot into an operatively raised limiting position, means to move said pusher blades between their respective limiting positions, an underfolder movable between a retracted position behind said platform and remote from said feed line forwardly across said feed line to a projected position in front of said platform, and means to operatively actuate said underfolder.

3. In an apparatus for threading a flexible tape through and into engagement with a buckle having a rear slot, an intermediate slot and a front slot, the combination of a threading platform for operatively supporting said buckle, buckle feed means operatively movable between a retracted position remote from said platform to a projected position adjacent thereto, tape feeding means having therein a tape conveyor movable along a predetermined feed line towards said platform, said platform being above the foremost portion of said feed line, a movable rear pusher blade normally in an operatively retracted limiting position below said platform and below the rear slot of said buckle when operatively disposed thereon, and positioned for movement upwardly through said rear slot into an operatively raised limiting position, a movable intermediate pusher blade normally in an operatively retracted limiting position above said platform and above the intermediate slot of said buckle, and positioned for movement downwardly through said intermediate slot into an operatively lowered limiting position, a movable front pusher blade normally in an operatively retracted limiting position below said platform and below the front slot of said buckle, and positioned for movement upwardly through said front slot into an operatively raised limiting position, means to move said pusher blades between their respective limiting positions, an underfolder movable between a retracted position behind said platform and remote from said feed line forwardly across said feed line to a projected position in front of said platform, and means to operatively actuate said underfolder.

4. In an apparatus for threading a flexible tape through and into engagement with a buckle having a rear slot, an intermediate slot and a front slot, the combination of a threading platform for operatively supporting said buckle, tape feeding means moving towards said platform along a predetermined feed line, a gripper at the rear of said platform and movable between an inoperative position remote from said feed line to an operative position intercepting said feed line, for holding engagement with said tape operatively moving therepast along said feed line, said platform being above the foremost portion of said feed line, a movable rear pusher blade normally in an operatively retracted limiting position below said platform and below the rear slot of said buckle when operatively disposed thereon, and positioned for movement upwardly through said rear slot into an operatively raised limiting position, a movable intermediate pusher blade normally in an operatively retracted limiting position above said platform and above the intermediate slot of said buckle, and positioned for movement downwardly through said intermediate slot into an operatively lowered limiting position, a movable front pusher blade normally in an operatively retracted limiting position below said platform and below the front slot of said buckle, and positioned for movement upwardly through said front slot into an operatively raised limiting position, means to move said pusher blades between their respective limiting positions, an underfolder movable between a retracted position behind said platform and remote from said feed line forwardly across said feed line to a projected position in front of said platform, and means to operatively actuate said gripper and underfolder.

5. In an apparatus for threading a flexible tape through and into engagement with a buckle having a rear slot, an intermediate slot and a front slot, the combination of a threading platform for operatively supporting said buckle, tape feeding means moving towards said platform along a predetermined feed line, a gripper at the rear of said platform and movable between an inoperative position remote from said feed line to an operative position intercepting said feed line, for holding engagement with said tape operatively moving therepast along said feed line, said platform being above the foremost portion of said feed line, a movable rear pusher blade normally in an operatively retracted limiting position below said platform and below the rear slot of said buckle when operatively disposed thereon, and positioned for movement upwardly through said rear slot into an operatively raised limiting position, a movable intermediate pusher blade normally in an operatively retracted limiting position above said platform and above the intermediate slot of said buckle, and positioned for movement downwardly through said intermediate slot into an operatively lowered limiting position, a movable front pusher blade normally in an operatively retracted limiting position below said platform and below the front slot of said buckle, and positioned for movement upwardly through said front slot into an operatively raised limiting position, means to move said pusher blades between their respective limiting positions, an underfolder movable between a retracted position behind said gripper and above said line of feed forwardly and downwardly across said feed line to a projected position in front of said platform, and means to operatively actuate said gripper and underfolder.

6. In an apparatus for threading a flexible tape through and into engagement with a buckle having a rear slot, an intermediate slot and a front slot, the combination of a threading platform for operatively supporting said buckle, tape feeding means moving towards said platform along a predetermined feed line, said platform being above the foremost portion of said feed line, a movable rear pusher blade normally in an operatively retracted limiting position below said platform and below the rear slot of said buckle when operatively disposed thereon, and positioned for movement upwardly through said rear slot into an operatively raised limiting position, a movable intermediate pusher blade normally in an operatively retracted limiting position above said platform and above the intermediate slot of said buckle, and positioned for movement downwardly through said intermediate slot into an operatively lowered limiting position, a movable front pusher blade normally in an operatively retracted limiting position below said platform and below the front slot of said buckle, and positioned for movement upwardly through said front slot into an operatively raised limiting position, a top folder spaced above said platform and movable between a retracted limiting position behind said platform to a forward limiting position above and in front of the intermediate slot of said buckle, means to move said pusher blades and top folder between their respective limiting positions, an underfolder movable between a retracted position behind said platform and remote from said feed line forwardly across said feed line to a projected position in front of said platform, and means to operatively actuate said underfolder.

7. In an apparatus for threading a flexible tape through and into engagement with a buckle having a rear slot, an intermediate slot and a front slot, the combination of a threading platform for operatively supporting said buckle, tape feeding means moving towards said platform along a predetermined feed line, said platform being above the foremost portion of said feed line, a movable rear pusher blade normally in an operatively retracted limiting position below said platform and below the rear slot of said buckle when operatively disposed thereon, and positioned for movement upwardly through said rear slot into an operatively raised limiting position, a movable intermediate pusher blade normally in an operatively retracted limiting position above said platform and above the intermediate slot of said buckle, and positioned for movement downwardly through said intermediate slot into an operatively lowered limiting position, a movable front pusher blade normally in an operatively retracted limiting position below said platform and below the front slot of said buckle, and positioned for movement upwardly through said front slot into an operatively raised limiting position, a top folder spaced above said platform and movable between a retracted limiting position behind said platform to a forward limiting position above and in front of the intermediate slot of said buckle, means to move said pusher blades between their respective limiting positions in the sequence of rear pusher blade, intermediate pusher blade and front pusher blade, means to move said front pusher blade between its said limiting positions a second time, yieldable means to move said top folder into pressing engagement with said rear pusher blade while the latter is in its raised limiting position, said yieldable means urging said top folder to its said forward limiting position, means to retract said top folder after the completion of the operative retracting movement of said intermediate pusher blade, an underfolder movable between a retracted position behind said platform and remote from said feed line forwardly across said feed line to a projected position in front of said platform, and means to operatively actuate said underfolder.

8. In an apparatus for threading a flexible tape through and into engagement with a buckle having a rear slot, an intermediate slot and a front slot, the combination according to claim 7, further provided with a gripper at the rear of said platform and movable between an inoperative position remote from said feed line to an operative position intercepting said feed line, for holding engagement with said tape operatively moving therepast along said feed line, means to move said gripper to its said operative position before said rear pusher blade is operatively moved upwardly, means to hold said gripper in its said position substantially until after said intermediate pusher blade is operatively moved downwardly, and means to retract said gripper.

9. In an apparatus for threading a flexible tape through and into engagement with a buckle having a rear slot, an intermediate slot and a front slot, the combination of a threading platform for operatively supporting said buckle, tape feeding means moving towards said platform along a predetermined feed line, said platform being above the foremost portion of said feed line, a movable rear pusher blade normally in an operatively retracted limiting position below said platform and below the rear slot of said buckle when operatively disposed thereon, and positioned for movement upwardly through said rear slot into an operatively raised limiting position, a movable intermediate pusher blade normally in an operatively retracted limiting position above said platform and above the intermediate slot of said buckle, and positioned for movement downwardly through said intermediate slot into an operatively lowered limiting position, a movable front pusher blade normally in an operatively retracted limiting position below said platform and below the front slot of said buckle, and positioned for movement upwardly through said front slot into an operatively raised limiting position, means to move said pusher blades between their respective limiting positions in the sequence of rear pusher blade, intermediate pusher blade and front pusher blade, means to move said front pusher blade between its said limiting positions a second time, an underfolder movable between a retracted position behind said platform and remote from said feed line forwardly across said feed line to a projected position in front of said platform, means to move said underfolder to its said projected position before said front pusher blade is operatively moved between its limiting positions said second time, and means to retract said underfolder after said front pusher blade has been moved said second time to its said retracted limiting position.

10. In an apparatus for threading a flexible tape through and into engagement with a buckle comprising two sides, a rear bar, a first intermediate bar, a second intermediate bar and a front bar defining a rear transverse slot, an intermediate transverse slot and a front transverse slot, and in which said front bar is split to present a throat communicating with said front slot, the combination of a threading platform for operatively supporting said buckle, tape feeding means moving towards said platform along a predetermined feed line, said platform being above the foremost portion of said feed line, a movable rear pusher blade normally in an operatively retracted limiting position below said platform and below the rear slot of said buckle when operatively disposed thereon, and positioned for movement upwardly through said rear slot into an operatively raised limiting position, a movable intermediate pusher blade normally in an operatively retracted limiting position above said platform and above the intermediate slot of said buckle, and positioned for movement downwardly through said intermediate slot into an operatively lowered limiting position, a movable front pusher blade normally in an operatively retracted limiting position below said platform and below the front slot of said buckle, and positioned for movement upwardly through said front slot into an operatively raised limiting position, means to move said pusher blades between their respective limiting positions, an underfolder movable between a retracted position behind said platform and remote from said feed line forwardly across said feed line to a projected position in front of said platform and spaced forwardly from and substantially at the level of the throat at the front of said buckle when it is operatively positioned on the platform, and means to operatively actuate said underfolder.

11. In an apparatus for threading a flexible tape through and into engagement with a buckle having a rear slot, an intermediate slot and a front slot, the combination according to claim 10, further provided with a spring-loaded tape holding finger positioned for yieldable engagement with the upper portion of said underfolder when the latter is in its said projected position, whereby the tape at said projected position of the underfolder will be operatively engaged by said tape holding finger.

12. In an apparatus for threading a flexible tape through and into engagement with a buckle having a rear slot, an intermediate slot and a front slot, the combination according to claim 10, further provided with a stop finger disposed at a position to the rear of and at a level below said projected position of said underfolder, said stop finger being movable between an operatively retracted position to a projected position below the position of said tape when operatively supported by said underfolder in its said projected position, and means to operatively actuate said stop finger.

13. In an apparatus for threading a flexible tape through and into engagement with a buckle having a rear slot, an intermediate slot and a front slot, the combination of a threading platform for operatively supporting said buckle, tape feeding means moving towards said platform along a predetermined feed line, said platform being above the foremost portion of said feed line, a movable rear pusher blade normally in an operatively retracted limiting position below said platform and below the rear slot of said buckle when operatively disposed thereon, and positioned for movement upwardly through said rear slot into an operatively raised limiting position, a movable intermediate pusher blade normally in an operatively retracted limiting position above said platform and above the intermediate slot of said buckle, and positioned for movement downwardly through said intermediate slot into an operatively lowered limiting position, a movable front pusher blade normally in an operatively retracted limiting position below said platform and below the front slot of said buckle, and positioned for movement upwardly through said front slot into an operatively raised limiting position, means to move said pusher blades between their respective limiting positions, an underfolder movable between a retracted position behind said platform and remote from said feed line forwardly across said feed line to a projected position in front of said platform and spaced forwardly from and substantially at the level of said buckle when it is operatively positioned on the platform, a stop finger disposed at a position to the rear of and at a level below said projected position of said underfolder, said stop finger being movable between an operatively retracted position to a projected position below the position of said tape when operatively supported by said underfolder in its said projected position, means to move said pusher blades between their respective limiting positions in the sequence of rear pusher blade, intermediate pusher blade and front pusher blade, means to move said front pusher blade between its said limiting positions a second time, means to move said underfolder to its said projected position before said front pusher blade is operatively moved between its limiting positions said second time, means to retract said underfolder after said front pusher blade has been moved said second time to its said retracted limiting position, means to move said stop finger to its said projected position after said underfolder has been operatively moved from its said projected position, and means to move said stop finger to its said retracted position.

14. In an apparatus for threading a flexible tape through and into engagement with a buckle having a rear slot, an intermediate slot and a front slot, the combination of a threading platform for operatively supporting said buckle, tape feeding means moving towards said platform along a predetermined feed line, said platform being above the foremost portion of said feed line, a movable rear pusher blade normally in an operatively retracted limiting position below said platform and below the rear slot of said buckle when operatively disposed thereon, and positioned for movement upwardly through said rear slot into an operatively raised limiting position, a movable intermediate pusher blade normally in an operatively retracted limiting position above said platform and above the intermediate slot of said buckle, and positioned for movement downwardly through said intermediate slot into an operatively lowered limiting position, a movable front pusher blade normally in an operatively retracted limiting position below said platform and below the front slot of said buckle, and positioned for movement upwardly through said front slot into an operatively raised limiting position, means to move said pusher blades between their respective limiting positions, an underfolder movable between a retracted position behind said platform and remote from said feed line forwardly across said feed line to a projected position in front of said platform, and means to operatively actuate said underfolder, said underfolder comprising a pivotally mounted arm, an arcuate bar extending forwardly therefrom and a pin extending inwardly from the front extremity of said bar, said pin being disposed in the line of feed of said tape, whereby it will operatively engage said tape when said underfolder is operatively moved from its said retracted to its said projected position.

15. In an apparatus for threading a flexible tape through and into engagement with a buckle having a rear slot, an intermediate slot and a front slot, the combination of a threading platform for operatively supporting said buckle, tape feeding means moving towards said platform along a predetermined feed line, said platform being above the foremost portion of said feed line, a movable rear pusher blade normally in an operatively retracted limiting position below said platform and below the rear slot of said buckle when operatively disposed thereon, and positioned for movement upwardly through said rear slot into an operatively raised limiting position, a movable intermediate pusher blade normally in an operatively retracted limiting position above said platform and above the intermediate slot of said buckle, and positioned for movement downwardly through said intermediate slot into an operatively lowered limiting position, a movable front pusher blade normally in an operatively retracted limiting position below said platform and below the front slot of said buckle, and positioned for movement upwardly through said front slot into an operatively raised limiting position, a top folder spaced above said platform and movable between a retracted limiting position behind said platform to a forward limiting position above and in front of the intermediate slot of said buckle, means to move said pusher blades and top folder between their respective limiting positions, an underfolder movable between a retracted postion behind said platform and remote from said feed line forwardly across said feed line to a projected position in front of said platform, and means to operatively actuate said underfolder, said top folder having a bar extending transversely across said platform, yieldable means urging said bar to said forward limiting position of said top folder, and means to return said bar to the said retracted limiting position of said top folder.

16. In an apparatus for threading a flexible tape through and into engagement with a buckle having a rear slot, an intermediate slot and a front slot, the combination of a threading platform for operatively supporting said buckle, tape feeding means moving towards said platform along a predetermined feed line, said platform being above the foremost portion of said feed line, a movable rear pusher blade normally in an operatively retracted limiting position below said platform and below the rear slot of said buckle when operatively disposed thereon, and positioned for movement upwardly through said rear slot into an operatively raised limiting position, a movable intermediate pusher blade normally in an operatively retracted limiting position above said platform and above the intermediate slot of said buckle, and positioned for movement downwardly through said intermediate slot into an operatively lowered limiting position, a movable front pusher blade normally in an operatively retracted limiting position below said platform and below the front slot of said buckle, and positioned for movement upwardly through said front slot into an operatively raised limiting position, means to move said pusher blades between their respective limiting positions, a pivotally mounted take-up arm movable between a retracted raised position above said feed line and downwardly across said feed line, means to hold said take-up arm in its said raised position, means to release said take-up arm from its said raised position, whereby said arm will pivotally move downwardly into engagement with said tape operatively disposed therebelow along said feed line, an underfolder movable between a retracted position behind said platform forwardly of said take-up arm and remote from said feed line forwardly across said feed line to a projected position in front of said platform, and means to operatively actuate said underfolder.

17. In an apparatus for threading a flexible tape through and into engagement with a buckle having a rear slot, an intermediate slot and a front slot, the combination of a threading platform for operatively supporting said buckle, tape feeding means comprising a main tape feed wheel, a roller thereabove and engageable with said wheel, a carrier wheel spaced forwardly from said main feed wheel and positioned to receive therefrom tape operatively fed by said main feed wheel, a conveyor belt disposed over and driven by said carrier wheel, said belt being movable towards said platform along a predetermined feed line, whereby said conveyor belt will carry forwardly tape operatively fed by said main feed wheel, a tape cutter between said two wheels and movable across the line of tape travel between said wheels, means to actuate said wheels, means to operate said cutter for severing said tape, said platform being above the foremost portion of said feed line, a movable rear pusher blade normally in an operatively retracted limiting position below said platform and below the rear slot of said buckle, when operatively disposed thereon, and positioned for movement upwardly through said rear slot into an operatively raised limiting position, a movable intermediate pusher blade normally in an operatively retracted limiting position above said platform and above the intermediate slot of said buckle, and positioned for movement downwardly through said intermediate slot into an operatively lowered limiting position, a movable front pusher blade normally in an operatively retracted limiting position below said platform and below the front slot of said buckle, and positioned for movement upwardly through said front slot into an operatively raised limiting position, means to move said pusher blades between their respective limiting positions, an underfolder movable between a retracted position behind said platform and remote from said feed line forwardly across said feed line to a projected position in front of said platform, and means to operatively actuate said underfolder.

18. In an apparatus for threading a flexible tape through and into engagement with a buckle having a rear slot, an intermediate slot and a front slot, the combination according to claim 17, said main feed wheel roller being movable between an operative position in engagement with said main feed wheel to a retracted position out of engagement therewith, means to actuate said roller between its said two positions, and tape tensioning means behind said main feed wheel and adapted for frictional engagement with tape operatively being received by said main feed wheel, whereby said tape received by said main feed wheel will be maintained under tension.

19. In an apparatus for threading a flexible tape through and into engagement with a buckle having a rear slot, an intermediate slot and a front slot, the combination according to claim 17, said main feed wheel roller being movable between an operative position in engagement with said main feed wheel to a retracted position out of engagement therewith, means to actuate said roller between its said two positions, and tape tensioning means behind said main feed wheel and adapted for frictional engagement with tape operatively being received by said main feed wheel, whereby said tape received by said main feed wheel will be maintained under tension, the diameter of said carrier wheel being greater than that of said main feed wheel.

20. In an apparatus for threading a flexible tape through and into engagement with a buckle having a rear slot, an intermediate slot and a front slot, the combination of a threading platform for operatively supporting said buckle, tape feeding means moving towards said platform along a predetermined feed line, said platform being above the foremost portion of said feed line, a movable rear pusher blade normally in an operatively retracted limiting position below said platform and directly below and in line with the rear slot of said buckle when operatively disposed thereon, and positioned for movement upwardly through said rear slot into an operatively raised limiting position, a movable intermediate pusher blade normally in an operatively retracted limiting position above said platform and directly above and in line with the intermediate slot of said buckle, and positioned for movement downwardly through said intermediate slot into an operatively lowered limiting position, a movable front pusher blade normally in an operatively retracted limiting position below said platform and directly below and in line with the front slot of said buckle, and positioned for movement upwardly through said front slot into an operatively raised limiting position, means to move said pusher blades between their respective limiting positions, each of said pusher blades being movable between said respective positions directly in line with said buckle slots to inner retracted positions out of line with said respective buckle slots, means to actuate said pusher blades between said respective inner retracted positions and said positions in line with said respective slots, an underfolder movable between a retracted position behind said platform and remote from said feed line forwardly across said feed line to a projected position in front of said platform, and means to operatively actuate said underfolder.

21. In an apparatus for threading a flexible tape through and into engagement with a buckle having a plurality of slots, the combination of a threading platform for operatively supporting said buckle, tape feeding means moving towards said platform along a predetermined feed line, said platform being at a level adjacent that of the foremost portion of said feed line, a plurality of pusher blades alternately arranged on opposite sides of said buckle and movable, respectively, between retracted limiting positions spaced from said slots and operative limiting positions through said respective slots, means to move said pusher blades between their respective limiting positions, an underfolder movable between a retracted position behind said platform and remote from said feed line forwardly across said feed line to a projected position in front of said platform, and means to operatively actuate said underfolder.

References Cited in the file of this patent

FOREIGN PATENTS 661,586     Great Britain _____ Nov. 21, 1951